US009795946B2

(12) United States Patent
Mendoza Gomez et al.

(10) Patent No.: US 9,795,946 B2
(45) Date of Patent: Oct. 24, 2017

(54) METHOD OF MANUFACTURING A CATALYST COMPRISING GOLD NANOPARTICLES, THE CATALYST AND ITS USE

(71) Applicant: GOLDEMAR SOLUTIONS S.L., Barcelona (ES)

(72) Inventors: Ernest Mendoza Gomez, Barcelona (ES); Jordi Llorca Pique, Barcelona (ES); Leonor Alves Rodrigues, Barcelona (ES); Edurne Galindo Sese, Barcelona (ES); Marta Santiago Redondo, Barcelona (ES)

(*) Notice: Subject to any disclaimer, the term of this patent is extended or adjusted under 35 U.S.C. 154(b) by 0 days.

(21) Appl. No.: 14/784,317

(22) PCT Filed: Apr. 9, 2014

(86) PCT No.: PCT/EP2014/057204
§ 371 (c)(1),
(2) Date: Oct. 14, 2015

(87) PCT Pub. No.: WO2014/170191
PCT Pub. Date: Oct. 23, 2014

(65) Prior Publication Data
US 2016/0045898 A1    Feb. 18, 2016

(30) Foreign Application Priority Data
Apr. 15, 2013 (EP) .................... 13382137

(51) Int. Cl.
*B01J 37/02* (2006.01)
*B01J 37/04* (2006.01)
(Continued)

(52) U.S. Cl.
CPC ............... *B01J 23/52* (2013.01); *A24D 3/16* (2013.01); *B01D 53/8678* (2013.01);
(Continued)

(58) Field of Classification Search
CPC .... B01J 37/04; B01J 37/0217; B01J 37/0219; B01J 21/185; B01J 21/063; B01J 21/08; B01J 23/10; B01J 23/52; B01J 23/745
(Continued)

(56) References Cited

U.S. PATENT DOCUMENTS 5,993,762 A    11/1999  Rajaram et al.
6,479,146 B1 *  11/2002  Caruso .................. A61K 9/5089
                                                                 106/409
(Continued)

FOREIGN PATENT DOCUMENTS

JP    2006272250 A    10/2006
WO   2008078970 A1    7/2008

OTHER PUBLICATIONS

International Search Report, PCT/EP2014/057204, dated May 13, 2014, 5 pages.
(Continued)

*Primary Examiner* — Cam N. Nguyen
(74) *Attorney, Agent, or Firm* — Senniger Powers LLP

(57) ABSTRACT

A method for the manufacture of a catalyst comprising substrate particles having gold nanoparticles thereon, the method comprising providing a first solution comprising gold nanoparticles; providing a second solution comprising substrate particles having polyelectrolyte on the surface thereof; and combining the solutions to form substrate particles having gold nanoparticles thereon. A catalyst comprising substrate particles having gold nanoparticles thereon, wherein the gold nanoparticles comprise capping agent comprising polyelectrolyte. A catalyst as a component of a cigarette filter, an air conditioning unit, an exhaust, or a diesel exhaust.

20 Claims, 8 Drawing Sheets

(51) Int. Cl.
| | |
|---|---|
| *B01J 21/06* | (2006.01) |
| *B01J 21/08* | (2006.01) |
| *B01J 23/10* | (2006.01) |
| *B01J 23/52* | (2006.01) |
| *B01J 23/745* | (2006.01) |
| *B01D 53/86* | (2006.01) |
| *B01D 53/94* | (2006.01) |
| *B01J 35/00* | (2006.01) |
| *B01J 21/18* | (2006.01) |
| *B01J 23/66* | (2006.01) |
| *A24D 3/16* | (2006.01) |
| *B01J 35/02* | (2006.01) |
| *B01J 37/34* | (2006.01) |

(52) U.S. Cl.
CPC .......... *B01D 53/945* (2013.01); *B01J 21/185* (2013.01); *B01J 23/66* (2013.01); *B01J 35/006* (2013.01); *B01J 35/0013* (2013.01); *B01J 35/023* (2013.01); *B01J 37/0217* (2013.01); *B01J 37/0219* (2013.01); *B01J 37/04* (2013.01); *B01J 37/341* (2013.01); *B01D 2255/106* (2013.01); *B01D 2255/2065* (2013.01); *B01D 2255/20707* (2013.01); *B01D 2255/20738* (2013.01); *B01D 2255/30* (2013.01); *B01D 2255/702* (2013.01); *B01D 2255/9202* (2013.01); *B01D 2258/012* (2013.01); *Y02T 10/22* (2013.01)

(58) Field of Classification Search
USPC .............. 502/184, 243, 304, 344, 350, 439
See application file for complete search history.

(56) References Cited

U.S. PATENT DOCUMENTS

| | | | | |
|---|---|---|---|---|
| 7,979,396 | B1* | 7/2011 | Krishnamurthy | G06F 17/30575 707/655 |
| 8,828,276 | B2* | 9/2014 | Hotta | B22F 1/0022 252/502 |
| 8,889,253 | B2* | 11/2014 | Kekicheff | B05D 3/00 427/203 |
| 2005/0208304 | A1* | 9/2005 | Collier | B01J 23/745 428/403 |
| 2009/0121872 | A1 | 5/2009 | Lynch et al. | |
| 2009/0269510 | A1* | 10/2009 | Lieberman | C23C 18/14 427/555 |
| 2010/0222501 | A1* | 9/2010 | Murthy | C08G 77/06 524/588 |
| 2011/0214492 | A1* | 9/2011 | Spiegl | G01N 3/40 73/78 |
| 2013/0045155 | A1 | 2/2013 | Brey et al. | |

OTHER PUBLICATIONS

Extended European Search Report, EP Application No. 13382137.1, dated Jul. 24, 2013, 13 pages.
Eguilaz et al., "Gold nanoparticles: Poly(diallyldimethylammonium chloride)-carbon nanotubes composites as platforms for the preparation of electrochemical enzyme biosensors: Application to the determination of cholesterol", Journal of Electroanalytical Chemistry, vol. 661, Issue 1, Oct. 1, 2011, pp. 171-178.
Jiang et al., "Selective Attachment of Gold Nanoparticles to Nitrogen-Doped Carbon Nanotubes", NANO Letters, American Chemical Society, Mar. 2003, vol. 3, No. 3, 3 pages.
Yeh et al., "Noncovalent Interaction between Gold Nanoparticles and Multiwalled Carbon Nanotubes via an Intermediatory", Research Article, Journal of Nanotechnology, vol. 2009, 7 pages.
Alves et al., "Synthesis and Stabilization of Subnanometric Gold Oxide Nanoparticles on Multiwalled Carbon Nanotubes and Their Catalytic Activity", Journal of the American Society, 2011, vol. 133(26), 11 pages.
Ruiz et al., "Combustion of diesel soot in N0/02 presence. Cesium nitrate and gold catalysts", Applied Catalysis A: General, 2011, 392, pp. 45-56.
Ribes et al., "Development and validation of a method for air-quality and nuisance odors monitoring of volatile organic compounds using multi-sorbent adsorption and gas chromatography/ mass spectrometry thermal desorption system", Journal of Chromatography A, Jan. 26, 2007, vol. 1140, Issues 1-2, pp. 44-55.
Sayle et al., "Strain and Architecture-Tuned Reactivity in Ceria Nanostructures; Enhanced Catalytic Oxidation of CO to C02", Chem. Mater., 2012, 24 (10), pp. 1811-1821.
Lin et al., "Synthesis, Characterization, and Bioconjugation of Fluorescent Gold Nanoclusters toward Biological Labeling Applications", ACS Nano, 2009, 3 (2), pp. 395-401.
Bao et al., "Nanoparticle-Free Synthesis of Fluorescent Gold Nanoclusters at Physiological Temperature", J. Phys. Chem. C2007, 111, pp. 12194-12198.
Djuricic et al., "Nanostructured Cerium Oxide: Preparation and Properties of Weakly-agglomerated Powders", Journal of the European Ceramic Society, vol. 19, Issue 11, Sep. 1999, pp. 1925-1934.
Liu et al., "The structures of VOx/MOx and alkali-VOx/MOx catalysts and their catalytic performances for soot combustion", Catalysis Today, 2006, 118, pp. 315-322.

* cited by examiner

METHOD OF MANUFACTURING A CATALYST COMPRISING GOLD NANOPARTICLES, THE CATALYST AND ITS USE

FIELD OF THE INVENTION

The invention relates to a catalyst and a method for the manufacture of a catalyst. In particular, the invention relates to a catalyst comprising gold nanoparticles.

BACKGROUND OF THE INVENTION

Diesel engines emit particulate matter such as soot, which is harmful to the environment. In order to decrease these emissions, catalytic filters are used in the exhaust pipe. However, such catalytic filters are not capable of combusting soot, since this takes place at a temperature range of 550-600° C. and therefore higher than the typical operating temperature of an exhaust (around 200° C., up to 580° C. during a combustion event)—*Catalysis Today* 118 2006. Catalysts capable of reducing the soot combustion temperature are known, such catalysts typically containing potassium, lithium, sodium or cesium. However, these are only capable of reducing the soot oxidation temperature to around 400° C.—Ruiz et al. *applied catal. A* 392 (2011)45. Catalysts containing nitrates are also known to decrease the soot oxidation temperature. However, such catalysts are not selective for $CO_2$, i.e. they are not capable of oxidising CO, even after the incorporation of transition metals.

Gold nanoparticles exhibit catalytic activity even at room temperature, particularly when the nanoparticles are smaller than about 3 nm. However, one of the problems associated with the incorporation of gold nanoparticles into a useful catalyst is that the gold nanoparticles tend to aggregate to form larger particles, and thereby lose their catalytic activity.

It is known to use stabilising agents to reduce aggregation of gold nanoparticles. However, since stabilising agents coat the surface of nanoparticles, the catalytic activity of the nanoparticles could be reduced. However, in the case of high temperature oxidations such as, for example, those carried out at around 300° C., the stabilising agent will be destroyed.

An alternative approach to prevent aggregation of gold nanoparticles is to immobilise the gold nanoparticles on a substrate. WO2010031890A1 discloses a method in which gold nanoparticles are immobilised on carbon nanotube substrates. In order to adhere the nanoparticles to the nanotubes, the nanotubes are coated with a compound containing an amino group. The amino groups act as nucleation centres where the Au nanoparticles are stabilised, reduced and anchored in the presence of a reducing agent such as sodium citrate. This is necessary since the polymer alone cannot reduce the gold. The resulting product may be used as a dispersed catalyst or as a coating for a support surface. However, the catalytic activity of the gold nanoparticles is reduced as the stabilization and further reduction of the nanoparticles is achieved via a chemical methodology. It should be noted that the main drawback of these procedures for obtaining the catalysts is that the stabilizing agent covers the surface of the nanoclusters, and thus significantly inhibits the catalytic activity thereof.

Mendoza et al, *J. Am. Chem. Soc.* 2001, 133, 10251-10261, discloses a method of obtaining stable carbon nanotube-supported gold nanoclusters. The carbon nanotubes are first wrapped with the polyelectrolyte polyallylamine hydrochloride, and are then re-suspended in water at pH 9. $HAuCl_4$ is added to the solution to form gold nanoclusters, which attach themselves to the carbon nanotubes. Sodium citrate is used as a stabiliser and soft reducing agent. The presence of citrate on the gold nanoparticles could reduce their catalytic activity.

SUMMARY OF THE INVENTION

The present invention seeks to tackle at least some of the problems associated with the prior art or at least to provide a commercially acceptable alternative solution thereto.

In a first aspect, the present invention provides a method for the manufacture of a catalyst comprising substrate particles having gold nanoparticles thereon, the method comprising:

providing a first solution comprising gold nanoparticles;

providing a second solution comprising substrate particles having polyelectrolyte on the surface thereof; and combining the solutions to form substrate particles having gold nanoparticles thereon.

DETAILED DESCRIPTION OF PREFERRED EMBODIMENTS

Figure 1:
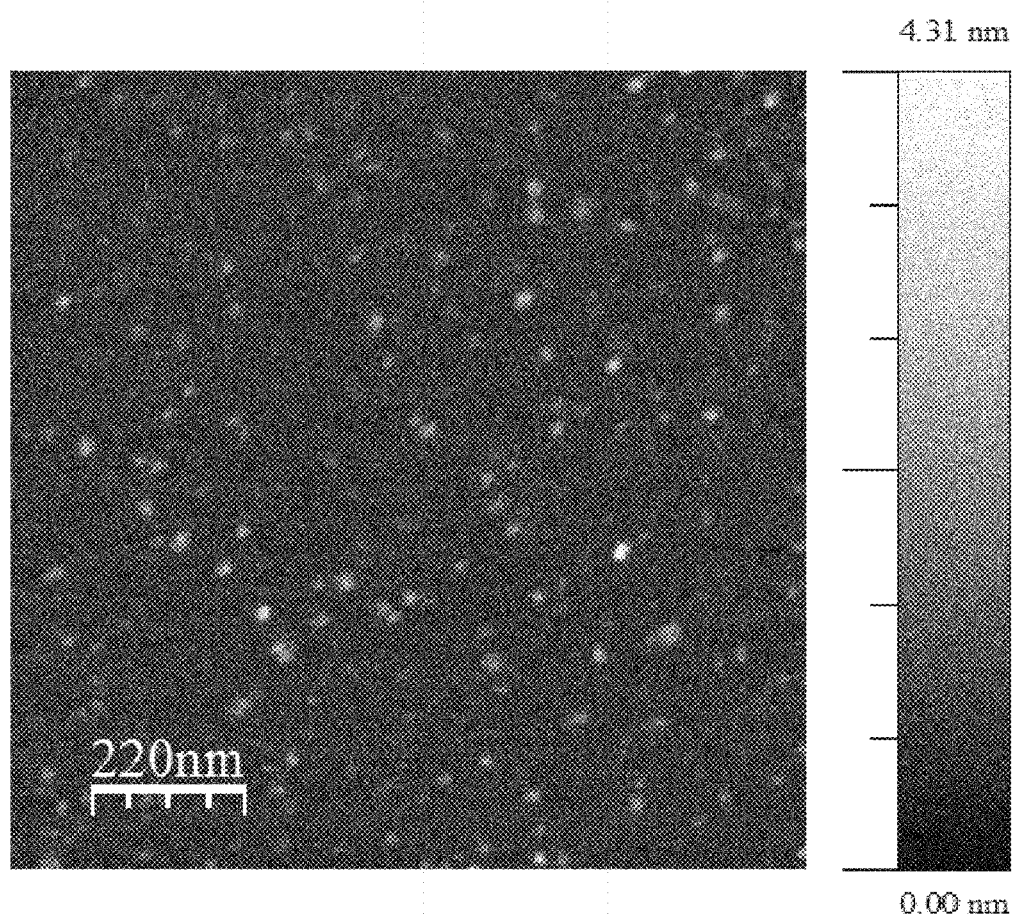
FIG. 1 is an atomic force microscopy (AFM) image showing gold nanoparticles formed during the method of Example 1.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "nanoparticle" used herein may encompass a particle having a longest dimension of from 0.1 to 100 nm.

The term "gold nanoparticle" as used herein may encompass a nanoparticle that consists of gold or a nanoparticle that comprises gold together with other elements such as, for example, other metals.

The term "polyelectrolyte" as used herein may encompass polymers whose repeating units bear an electrolyte group. These groups may dissociate in aqueous solutions, making the polymers charged. Polyelectrolytes are sometimes referred to as "polysalts".

The term "capping agent" as used herein may encompass a species that, when present on the surface of metal particles, reduces agglomeration of the metal particles, enables particle size control during powder production and reduces particles' surface oxidation or other contamination.

With regard to the term "longest dimension" as used herein, when the particles are spherical, the longest dimension will be the diameter of the sphere.

In the method of the first aspect, the gold nanoparticles are formed prior to being contacted with the substrate particles. In other words, the gold nanoparticles are not formed in situ. The inventors have surprisingly found that when the gold nanoparticles are formed prior to being contacted with the substrate particles, it is possible to attach the gold nanoparticles to a wider variety of substrate particles such as, for example, substrates comprising inorganic oxides. This is particularly advantageous since, in contrast to carbon nanotubes, inorganic oxides are stable at high temperatures. Accordingly, the catalyst is suitable for use in a high temperature environment such as, for example, a vehicle exhaust.

In contrast to methods of the prior art in which gold nanoparticles are formed in situ, the method of the present invention can be more easily scaled up, and is also capable of operating as a continuous method, thereby being a more economical process. The method exhibits high reproducibility and is also environmentally friendly.

The catalyst may be an oxidation catalyst. Alternatively, the catalyst may be a reduction catalyst.

The presence of a polyelectrolyte on the surface of the substrate particles helps to "bind" the gold nanoparticles to the substrate particles via an electrostatic charge. The substrate particles typically have multiple gold nanoparticles thereon. The gold nanoparticles are typically highly dispersed on the substrate particles. The substrate particles are typically larger than the gold nanoparticles. In an alternative embodiment, it is possible to replace the polyelectrolyte with another species that is capable of binding the gold nanoparticles via an electrostatic charge, i.e. another species having an opposite charge to the gold nanoparticles.

The solutions may be combined in any appropriate manner. Typically the first solution is added drop-wise to the second solution. This may help to avoid aggregation of the gold nanoparticles. Combining the solutions typically results in a mixture containing substrate particles having gold nanoparticles thereon.

The first and/or second solutions may comprise a solvent selected from, for example, water, ethanol, THF, acetone, methanol and mixtures of two or more thereof. Preferably the solvent comprises water and/or ethanol.

The combined solutions are preferably agitated. Agitation increases the rate of formation and/or yield of gold nanoparticles. In addition, the gold nanoparticles are more evenly distributed over the substrate without significant formation of agglomerations. As a result, the gold nanoparticles attached to the substrate have a small size and narrow size distribution. Examples of agitation include, but are not limited to, stirring, shaking and sonication. Sonication, preferably ultrasonication, is particularly effective at increasing the yield of gold nanoparticles and providing evenly distributed small gold nanoparticles having a narrow size distribution. The use of sonication over vigorous stirring may increase the yield in excess of 10 times.

The agitation is typically carried out at room temperature. Agitation such as, for example, ultrasonication, may increase the temperature of the solutions. Accordingly, a cooler may be used to maintain the temperature of the solutions. Preferably, the solutions are maintained at a temperature of less than 50° C., more preferably less than 35° C. Higher temperatures may inhibit the formation of nanoparticles. Agitation is typically carried out from 5 minutes to 1 hour, more typically around 30 minutes. However, shorter or longer agitation times may also be used. Sonication is typically carried out with a power of at least 10 W, preferably from 40 to 10000 W, more preferably from 100 to 10000 W, even more preferably from 500 to 5000 W.

A precipitant agent may be advantageously added to the first solution in order to promote precipitation of the gold nanoparticles onto the substrate particles. Preferred precipitant agents include, for example, ammonium hydroxide, ammonium carbonate and mixtures thereof. The use of a precipitant agent may avoid the need to use agitation.

Preferably at least some of the gold nanoparticles have a longest dimension of not more than 8 nm, preferably not more than 5 nm, more preferably not more than 4 nm, even more preferably from 0.1 to 3 nm, still even more preferably from 0.5 to 2 nm. The oxidising power of the gold nanoparticles increases as the size decreases. However, gold nanoparticles having a longest dimension of less than about 0.1 nm degrade quickly, even under relatively inert conditions, meaning the that lifetime of the particles decreases. Gold nanoparticles having a longest dimension of not more than 3 nm are able to dissociate molecular oxygen, even at room temperature. The longest dimensions may be determined by using atomic force microscopy. Typically, most of the gold nanoparticles have longest dimensions within these ranges, more typically substantially all of the gold nanoparticles have longest dimensions within these ranges.

The gold nanoparticles preferably comprise a capping agent. The presence of a capping agent may help to reduce agglomeration of the gold nanoparticles, enable particle size control during powder production and reduce the particles' surface oxidation or other contamination. The capping agent preferably comprises a polyelectrolyte and/or polymer capable of reducing gold. Examples of suitable capping agents include, but are not limited to, polymethylacrylic acid (PMAA) and polyallylamine (PAA).

The capping agent preferably comprises polymethylacrylic acid (PMAA). The inventors have surprisingly found that, compared to other capping agents used in the art, such as citrate, when polymethylacrylic acid is used as a capping agent, fewer molecules of polymethylacrylic acid are present at the surface of the clusters. Accordingly, the gold nanoparticles exhibit improved catalytic activity when attached to the substrate particles. In addition, in comparison to capping agents such as thiolates, polymethylacrylic acid can be removed from the gold nanoparticles by heating at lower temperatures. Accordingly, damage to substrate particles is reduced. Furthermore, in comparison to citrate capping agents, polymethylacrylic acid capping agents undergo faster reaction to form the gold nanoparticles and result in smaller nanoparticles. In addition, the nanoparticles comprising polymethylacrylic acid exhibit higher stability and longer lifetime while in solution. Accordingly, the method is more easily scaled up.

Preferably the step of providing a first solution comprising gold nanoparticles comprises:
   contacting a gold precursor with a capping agent, preferably comprising polymethylacrylic acid (PMAA); and
   agitating the contacted gold precursor and capping agent, preferably by ultrasonication.

The combination of a polymethylacrylic acid capping agent with the use of ultrasonication is particularly effective. This combination improves the confinement of the gold nanoparticles, and therefore results in a reduced size of the gold nanoparticles and a smaller size distribution. Accordingly, the oxidation catalyst exhibits the combination of high stability and high oxidising power.

Chloroauric acid, HAuCl₄, is a suitable gold precursor. Other gold precursors may be used such as, for example, gold acetates and gold chloroaurates.

The capping agent preferably comprises carboxylate groups and the ratio of carboxylate groups to metal is preferably less than 1, more preferably less than 0.75, even more preferably from 0.05 to 0.6, still even more preferably from 0.1 to 0.5. Smaller ratios may result in a decrease in the stability of the gold nanoclusters. Higher ratios may result in agglomeration of gold nanoparticles and therefore, in a decrease in the catalytic activity of the gold nanoparticles.

The substrate particles preferably comprise one or more of carbon nanotubes, activated carbon, graphene and inorganic oxides. Such substrates are particularly suitable for attaching metal clusters. Furthermore, such particles are typically used in catalyst materials. More preferably, the substrate particles comprise one of more of activated carbon, graphene and inorganic oxides. Due to their high temperature stability, inorganic oxides are particularly suitable for catalysts for use in high temperature environments such as, for example, vehicle exhausts. The inorganic oxides preferably comprise one or more of $CeO_2$, $TiO_2$, $ZrO_2$, $Fe_2O_3$ and $SiO_2$. Such inorganic oxides are particularly suitable to be placed in environments requiring oxidation catalysts such as, for example, vehicle exhausts, air conditioning units and cigarettes. $CeO_2$ is a particularly preferred substrate material.

The substrate particles are preferably porous, more preferably mesoporous. This increases the surface area of the particles, meaning that they exhibit higher oxidising power-to-weight ratios.

Examples of suitable polyelectrolytes include, but are not limited to, polyallylamine (PAA), poly(ethyleneimine), poly(diallyldimethylammonium chloride) (PDDA) and any other polyelectrolyte containing amino groups and/or a net surface charge.

Preferably the polyelectrolyte comprises polyallylamine. Polyallylamine is particularly effective at binding the gold nanoparticles to the substrate. Furthermore, in comparison to thiolate polyelectrolytes, the catalytic ability of the gold nanoparticles when attached to the substrate is increased. This is because the gold-sulfur bond formed by thiolate polyelectrolytes is almost covalent in strength.

Preferably the combined solutions comprise from 0.01 to 10 wt % gold with respect to the weight of the substrate, more preferably from 0.1 wt. % to 10 wt. %. If the combined solutions comprise less than 0.01 wt % gold, typically less than 0.1 wt. % gold, then the small number of gold nanoparticles formed on the substrate results in the particles exhibiting low catalytic activity. If the combined solutions contain greater than 10 wt % gold, then the size of the gold nanoparticles formed on the substrate increases. Accordingly, the oxidising power of the gold nanoparticles decreases.

The method may be a batch method or a continuous method. Preferably the method is a continuous method. Continuous methods are easier to scale up and are also more economical. Furthermore, continuous methods allow better control of synthesis conditions, such as control of temperature and sonication. In addition, "in-line" quality control is possible in a continuous method, for example by the use of fluorescence spectroscopy.

Preferably the method further comprises recovering the substrate particles having gold nanoparticles thereon, preferably by precipitation-deposition followed by filtration and drying (such as, for example, conventional and/or spray drying), or lyophilising, more preferably by freeze drying. Such recovered particles may be suitable for use as a solid dispersed catalyst. Alternatively, the substrate particles may be recovered from the solvent by being deposited on the surface of a support material.

Preferably the method further comprises calcination of the substrate particles having gold nanoparticles thereon. If the gold nanoparticles comprise capping agent, then calcination results in the removal of at least some of the capping agent from the gold nanoparticles. Accordingly, the catalytic activity of the gold nanoparticles increases.

In a particularly preferred embodiment, the substrate particles are selected from inorganic oxides and the capping agent comprises polymethlacrylic acid. In a still further preferred embodiment, the substrate particles are selected from inorganic oxides, the capping agent comprises polymethlacrylic acid, the gold nanoparticles have a longest dimension of from 0.1 to 8 nm, and the substrate particles have a longest dimension of from 10 to 200 nm.

In a further aspect, the present invention provides a method for the manufacture of a catalyst comprising substrate particles having gold nanoparticles thereon, the method comprising:

providing a first solution comprising gold nanoparticles;

providing a second solution comprising substrate particles having polyelectrolyte on the surface thereof;

combining the solutions to form a mixture containing substrate particles having gold nanoparticles thereon; and recovering from the mixture at least some of the substrate particles having gold nanoparticles thereon.

In a further aspect, the present invention provides a catalyst obtainable by the method described herein.

In a further aspect, the present invention provides an oxidation catalyst comprising substrate particles having gold nanoparticles thereon, wherein the gold nanoparticles comprise capping agent comprising polyelectrolyte.

The catalyst may be an oxidation catalyst. Alternatively, the catalyst may be a reduction catalyst. Typically the catalyst will be an oxidation catalyst.

The oxidation catalysts described herein may exhibit high oxidising power. For example, the oxidation catalysts are capable of oxidising carbon monoxide at room temperature and are capable of reducing the combustion temperature of Diesel soot to around 350° C., or even as low as around 260° C. This makes the catalyst suitable for use in environments such as, for example, cigarette filters and vehicle exhausts. The oxidation catalysts are also capable of oxidising volatile organic compounds (VOCs) such as, for example, ethanol, propanol, acetone, carbon disulfide, methyl acetate, isopropanol, tert-butylmethylether, n-hexane, butanal, ethyl acetate, chloroform, tetrahydrofuran, carbon tetrachloride, benzene, 1-butanol, trichchloroethylene, methylisobutylketone, toluene, 1,1,2-trichloroethane, butyl acetate, hexanal, formaldehyde, ethylenebenzene, m+p-xyxlene, o-xylene, styrene, heptanal, a-pinene, cyclohexanone, propylbenzene, 2-butoxyethanol, limonene, p-dichlorobenzene, naphthalene, octanol, nonanal and decanal. The oxidation catalysts are particularly effective at oxidising compounds containing aldehyde function groups, especially formaldehyde. The ability to oxidise VOCs makes the catalysts particularly suitable for use air conditioning units and air purification systems.

Without being bound by theory, it is considered that the ability of the catalysts of the present invention to oxidise carbon monoxide at room temperature is due to the fact that, in use, the gold creates a monolayer of oxygen at the surface of the catalyst. This is in contrast to catalysts containing platinum group metal nanoparticles, for example, which employ a different reaction mechanism. Such catalysts activate oxygen at the interface of the substrate, and therefore are not suitable for operation at temperatures below around 200 to 300° C.

The substrate particles typically have multiple gold nanoparticles thereon. The gold nanoparticles are typically highly dispersed on the substrate particles. The substrate particles are typically larger than the gold nanoparticles. The substrate particles typically have a longest dimension of from 1 to 200 nm, more typically from 8 to 150 nm, even more typically from 10 to 100 nm.

Gold nanoparticles exhibit high oxidising power. Since the gold nanoparticles are supported on the substrate, they are prevented from aggregating, which would increase their size and therefore decrease their oxidising power.

The capping agent preferably comprises polymethylacrylic acid (PMAA). As discussed above, compared to other capping agents used in the art, such as citrate, when polymethylacrylic acid is used as a capping agent, less molecules of polymethylacrylic acid are present at the surface of the clusters. Accordingly, the gold nanoparticles exhibit improved catalytic activity when attached to the substrate particles. In addition, in comparison to capping agents such as thiolates, polymethylacrylic acid can be removed from the gold nanoparticles by heating at lower temperatures.

Preferably at least some of the gold nanoparticles have a longest dimension of not more than 8 nm, preferably not more than 5 nm, more preferably not more than 4 nm, even more preferably from 0.1 to 3 nm, still even more preferably from 0.5 to 2 nm. Preferably the substrate particles comprise one or more of carbon nanotubes, active carbon and inorganic oxides, preferably comprising one or more of $CeO_2$, $TiO_2$, $ZrO_2$, $Fe_2O_3$ and $SiO_2$.

Preferably the catalyst comprises less than 5 wt % gold, more preferably less than 3 wt % gold, even more preferably from 0.05 to 1 wt % gold, still even more preferably from 0.07 to 0.5 wt % gold. Higher levels of gold increase the chances of agglomeration of the gold nanoparticles on the substrate, thereby resulting in a decrease in the oxidising power of the gold nanoparticles. With higher levels the particles are closer together and this increases the probability of coalescence and particle growth. Lower levels of gold may reduce the number of gold nanoparticles, resulting in the catalysts exhibiting only limited oxidising power.

The gold nanoparticles are typically supported on the substrate particles via polyelectrolyte, preferably comprising polyallylamine. The polyelectrolyte "binds" the gold nanoparticles to the substrate particles via an electrostatic charge. The combination of the substrate particles and polyelectrolyte may reduce aggregation of the gold nanoparticles.

The particles may be attached to a support material. This results in a catalyst material that is more easy to handle. Examples of suitable support materials include, but are not limited to, inorganic oxides such as, for example, $CeO_2$, $TiO_2$, $Fe_2O_4$, $Fe_3O_4$, $MgO$, $Al_2O_3$, $La_2O_3$, $ZrO_2$ and mixtures thereof; adsorbents such as, for example, active carbon and zeolites; and composites such as, for example, composites based on mixtures of inorganic oxides and adsorbents.

The capping agent is typically at least partially removed from gold nanoparticles prior to use of the oxidation catalyst, typically by calcination. Removal of capping agent increases the oxidising power of the gold nanoparticles. Since the gold nanoparticles are immobilised on the substrate particles, they are prevented from aggregating.

In a further aspect, the present invention provides a cigarette filter comprising the oxidation catalyst as described herein. Since the oxidation catalyst is capable of oxidising carbon monoxide at room temperature, the cigarette filter can reduce the amount of carbon monoxide that is inhaled by a smoker. In a further aspect the present invention provides a cigarette comprising the cigarette filter as described herein.

In a further aspect the present invention provides an air conditioning unit comprising the oxidation catalyst as described herein.

In a further aspect the present invention provides an exhaust, preferably a diesel exhaust, comprising the oxidation catalyst as described herein. The oxidation catalyst is particularly effective in a diesel exhaust because it is capable of oxidising soot at typical operating temperatures of diesel exhausts (i.e. from 200 to 400° C.). In addition, in contrast to prior art exhaust catalysts, the catalysts of the present invention are selective for $CO_2$, i.e. they are capable of oxidising CO.

In a further aspect the present invention provide an exhaust, such as a diesel exhaust, an air conditioning unit or a cigarette filter comprising an oxidation catalyst comprising substrate particles having gold nanoparticles thereon.

In a further aspect the present invention provides the use of the oxidation catalyst described herein for the oxidation of one or more of soot, carbon monoxide and formaldehyde.

Figure 8:
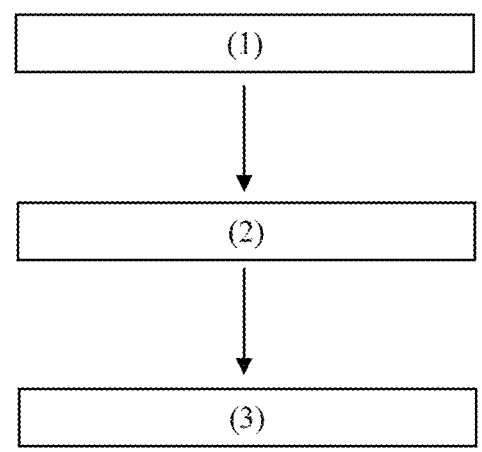
FIG. 8 shows a schematic of the method of the present invention.

As shown in the schematic of FIG. 8, the present invention provides a method for the manufacture of a catalyst comprising substrate particles having gold nanoparticles thereon, the method comprising: (1) providing a first solution comprising gold nanoparticles; (2) providing a second solution comprising substrate particles having polyelectrolyte on the surface thereof; and (3) combining the solutions to form substrate particles having gold nanoparticles thereon.

The invention will now be described in relation to the following non-limiting examples.

Example 1

A solution of gold nanoparticles was prepared by ultrasonication of an aqueous solution of tetrachloroauric acid ($HAuCl_4$) and sodium polymethylacrylate. The resulting solution had a final gold concentration of 0.02 mg/ml, and the molar ratio of gold to the carboxylate groups of the polymethylacrylic acid was 2. The pH of the solution was adjusted to 4.5 by the addition of nitric acid ($HNO_3$), and the oxygen dissolved in the solution was eliminated by bubbling through argon gas for 30 minutes. After the oxygen was removed, the solution was ultrasonicated for about 20 minutes using a Branson 250D probe sonicator operated at 200 W to form gold nanoparticles. The resulting aqueous solution had a concentration of 0.02 mg of gold nanoparticles per ml. FIG. 1 shows an atomic force microscopy image of the gold nanoparticles. (The nanoparticles have been placed on a mica surface in order to capture the image.) Numerous gold nanoparticles are visible on the mica surface.

A suspension of carbon nanotubes was prepared in a 1% aqueous solution of polyallylamine hydrochloride to achieve a concentration of 1 mg of carbon nanotubes per ml. The suspension was then dispersed using an ultrasonic Branson 250D probe sonicator operated at 250 W for 30 minutes to ensure that the carbon nanotubes were suspended individually. Due to the presence of polyallylamine, the surface of the carbon nanotubes had a net electric charge.

The aqueous solution of carbon nanotubes was mixed with the aqueous solution of gold nanoparticles to provide a combined solution containing 1 wt % gold with respect to carbon nanotube. The combined solutions were then subjected to ultrasonication for 15 minutes using a 250D probe sonicator operated at 100 W. As a result of the ultrasonication, the gold nanoparticles were dispersed on the surface of the carbon nanotubes. Due to the presence of the polyelectrolyte, which provides the surfaces of the carbon nanotubes with an electrical charge, gold nanoparticles were attached to the surfaces without forming agglomerates. Accordingly, the resulting aqueous solution contained nanotubes having gold nanoparticles highly dispersed thereon, in which the nanoparticles exhibited small size and narrow size distribution.

Figure 2:
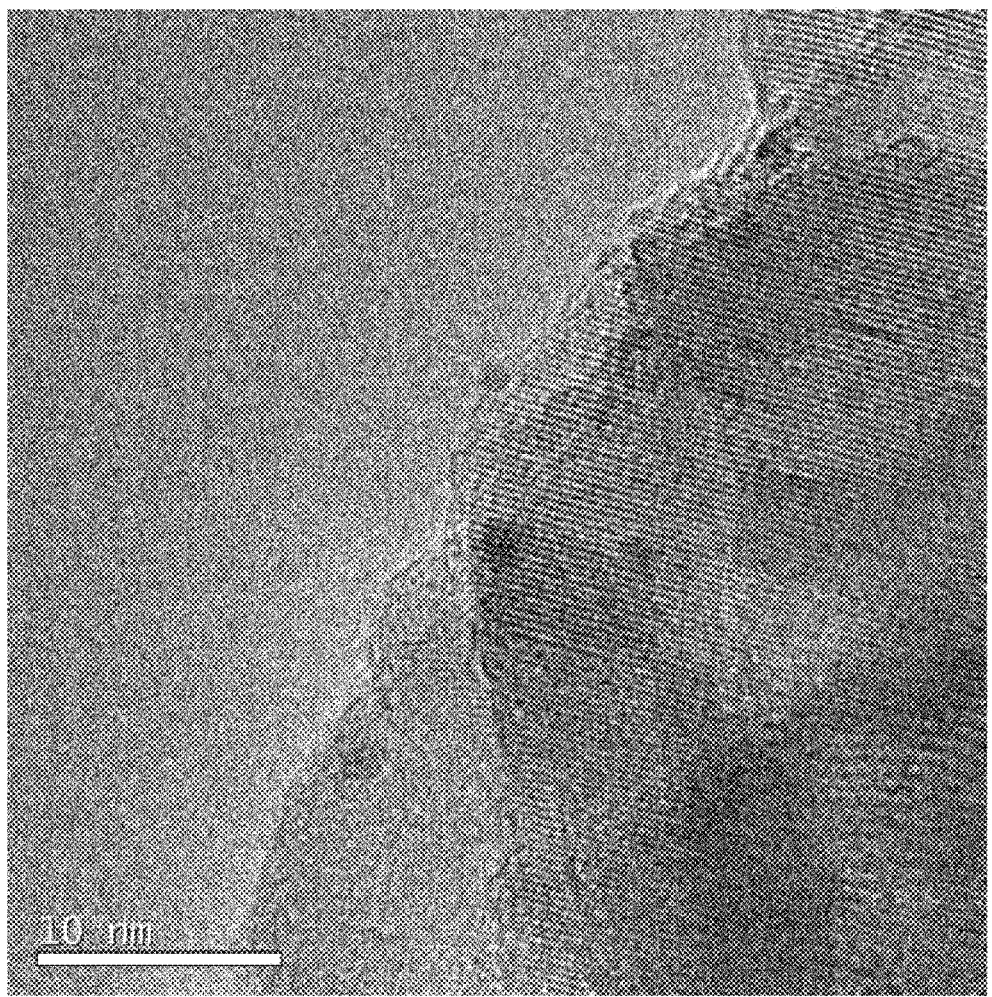
FIG. 2 is a transmission electron microscope (TEM) image of the catalyst of Example 1.

The aqueous solution was then subjected to vacuum filtration to recover the nanotubes with gold nanoparticles thereon as a fine powder. FIG. 2 is a transmission electron microscopy image showing a detailed area of the powder obtained. As shown, the Au nanoparticles are attached to the surface of the carbon nanotubes. The nanoparticles are visible as dark spots on the graphitic structure of the carbon nanotubes. It should be noted that the number of nanoparticles in the image is not large as they are deposited in a small proportion, which in this example is 1% by weight.

Example 2

Cerium oxide substrate particles were synthesized by a precipitation method at constant pH (8.0). Hexahydrated cerium (III) nitrate ($Ce(NO_3)_3.6H_2O$—99.9%, Sigma-Aldrich) and ammonium hydroxide ($NH_4OH$—99.9%, Sigma-Aldrich) were used as the raw material and precipitation agent, respectively. Solutions of 0.1 M $Ce(NO_3)_3.6H_2O$ and 1M $NH_4OH$ were mixed drop-wise under stirring at 25° C. until precipitation was complete. The slurry was then aged at 25° C. for 1 hour under vigorous stirring. The resulting precipitate was filtered and thoroughly washed with de-ionized water and ethanol. The solid (ceria precursor) was then dried at 80° C. for 12 hours and thermally decomposed in static air at 400° C. for 4 hours with a ramp of 2° C. $min^{-1}$ to obtain porous cerium oxide.

The cerium oxide was then dispersed in a 0.1 wt % aqueous solution of polyallylamine hydrochloride (Sigma-Aldrich) at pH 9 to a concentration of 10 mg/ml. To ensure dispersal of the support, a combination of rapid stirring and ultrasonication was used. Excess polyallylamine hydrochloride was removed by vacuum filtration and successive washing with ultrapure water, before re-suspending the support in water at pH 9.

Gold nanoparticles were synthesized by sonochemical synthesis using chloroauric acid ($HAuCl_4$—99.99%, Sigma-Aldrich) as the gold precursor, and polymethylacrylic acid with a molecular weight of Mw=9650 $g \cdot mol^{-1}$ (Sigma-Aldrich) as the capping agent to stabilize and protect the gold nanoparticles in the solution. The ratio of carboxylate groups to gold ($RCO_2$/gold) was 0.5. The solution was then adjusted to pH 4.5 with 0.1 M $HNO_{3(aq)}$, transferred to a sealed vessel and sparkled with $N_2$ for at least 1 hour at 25° C. Finally, the solution was continuously fed at room temperature to a sonication chamber. During the sonochemical process, the chamber was connected to a cooling-system to keep the temperature constant. Residence time in the chamber and sonication output power were 30 minutes and 100 Watts, respectively.

Finally, an adequate amount of the gold nanoparticle solution was added drop-wise to the ceria support solution to obtain a metallic gold content of 0.1 wt %. Then, the solution containing the gold nanoparticles and the ceria was ultrasonicated for 30 min at room temperature, frozen and dried using freeze-drying. Finally, the materials were calcined at 300° C. for 2 hours, using a heating ramp of 3° C. $min^{-1}$.

Evaluation of Catalytic Activity (CO Oxidation):

The catalytic activity of this sample was evaluated and compared with $CeO_2$. This catalytic test is necessary, since $CeO_2$ may be active for CO decomposition due to its redox properties (the shift between the Ce (III) to Ce (IV) states leads to high oxygen mobility in ceria lattice, which in turn can lead to its enhanced catalytic activity).

Catalytic tests were carried out in a quartz fixed-bed reactor (8 mm i.d.) with 200 mg of sample (sieve fraction 200-300 mm), a total pressure of 1 bar, and a weight-hourly space velocity (WHSV) of 30,000 ml $g^{-1}$ $h^{-1}$. Steady-state tests were conducted isothermally in the range of 30-400° C. in a mixture containing 2 vol. % CO and 2 vol. % $O_2$ in $N_2$. Generally, 30 min after a change of conditions, the conversion levels have been observed to be constant and considered as the steady state. Prior to the tests, the samples were pre-treated at 400° C. in nitrogen for 1 hour. The degree of CO conversion was determined from analysis by gas chromatography (SRA Instruments Micro-GC 3000) equipped with HP-PlotQ and HP-Plot MoleSieve columns and a TCD detector. The stability of selected catalysts is studied by means of isothermal tests in the gas mixture up to −700° C. Finally, in order to determine any possible sign of deactivation of the catalyst, the catalyst was subjected to extreme thermal aging for 4 hours at 850° C. Subsequently, the temperature was set to 400° C. for a further assessment of CO conversion in the range of 400-850° C. ($1^{st}$ up cycle), 303-673 K ($2^{nd}$ up cycle) and 500-850° C. ($3^{rd}$ up cycle). Prior to the tests, the samples were pre-treated at 400° C. in nitrogen for 1 hour. In this case, the catalytic tests were performed using 50 mg of catalyst (sieve fraction 200-300 mm), a total pressure of 1 bar, and a weight-hourly space velocity (WHSV) of 120.000 ml $g^{-1}$ $h^{-1}$ were used and the degree of CO conversion was determined from analysis by GC-MS (Agilent) equipped with HP-PlotQ column.

Figure 3:
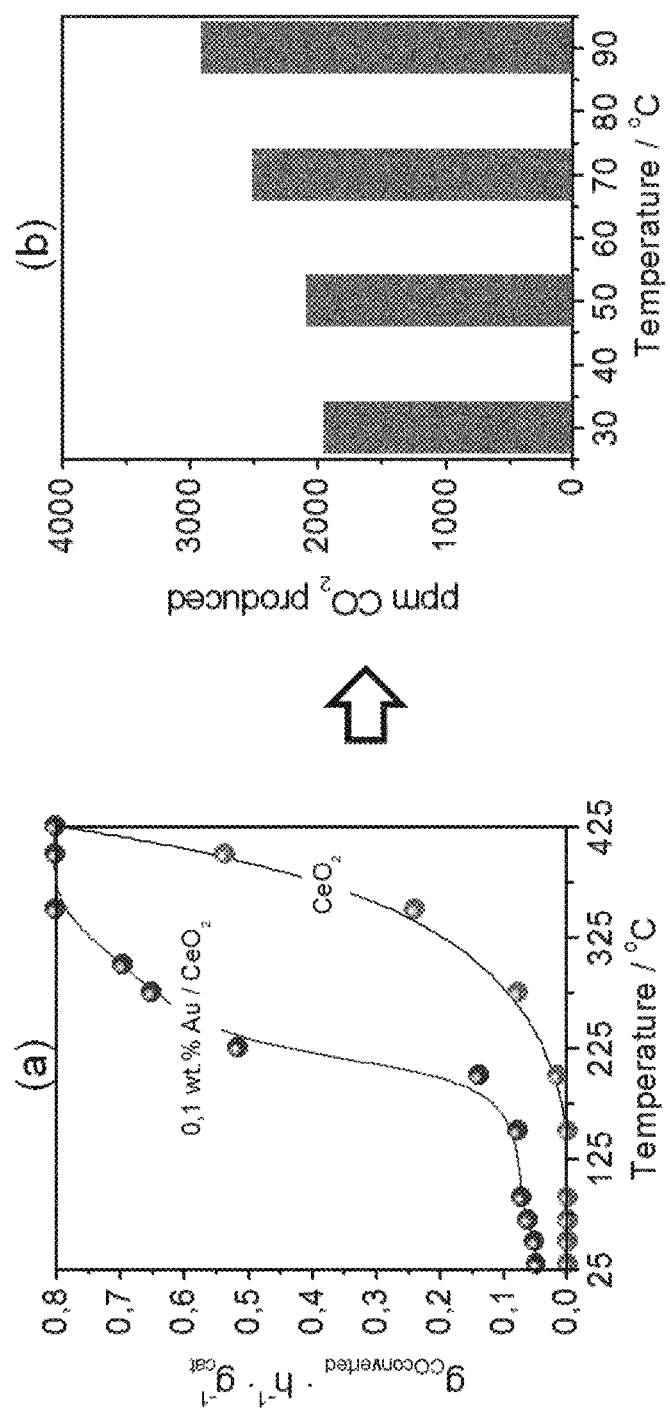
FIG. 3 shows a graph comparing the catalytic activity of the catalyst of Example 2 and CeO2 (a) and a graph of CO2 converted over time for the catalyst of Example 2 (b)

FIG. 3($a$) shows grams of CO converted/h·g of catalyst for a mixture containing $CO+O_2+N_2$ for both catalysts. As expected, $CeO_2$ is active at temperatures higher than 225° C. and the light-off (temperature for 50% CO oxidation) is 375° C. In accordance with $S_{BET}$ and X-ray diffraction analysis, the $CeO_2$ prepared by a simple co-precipitation method shows purely mesoporous properties and small crystallite size, i.e. 13 nm. These properties enhance the redox properties induced by the oxygen mobility in the ceria lattice, and hence the catalytic activity of the material. By adding only 0.1 wt. % of gold nanoclusters, another catalytic scenario appears: the oxidation of CO occurs at room temperature and the ppm of $CO_2$ produced corresponding to the oxidation of CO can be visualized in FIG. 3($b$): 0.1 wt. % of supported gold nanoparticles results in the production of 2000 ppm of $CO_2$ from CO decomposition. Furthermore, a slight increase in the temperature up to 90° C. leads to higher values of CO oxidation (3000 ppm of $CO_2$ converted).

Figure 4:
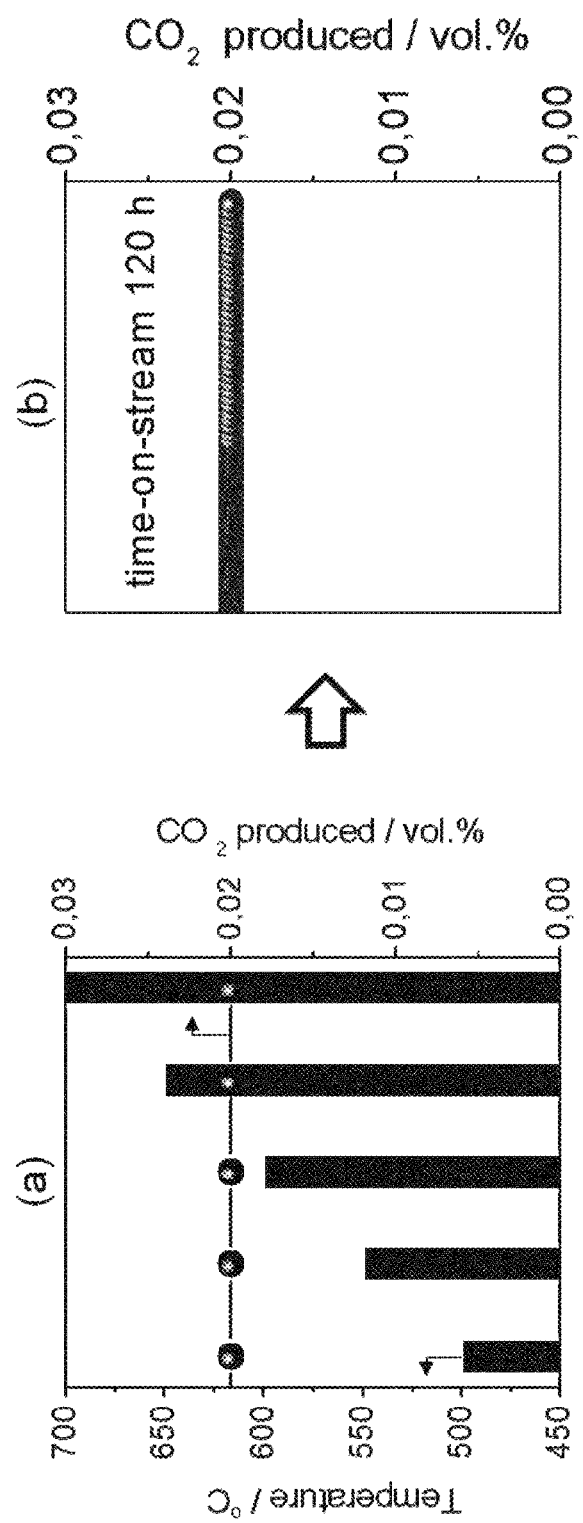
FIG. 4 shows a graph of the CO2 produced from CO oxidation with time in the temperature range of 500-700° C. for Example 2 (a) and a graph of the amount of CO2 produced over time at 700° C.

The short-term stability of the 0.1 wt. % $Au/CeO_2$ catalyst was then assessed by monitoring the amount of $CO_2$ produced from CO oxidation over time in the temperature range of 500-700° C. As illustrated in FIG. 4a, any sign of deactivation can be visualized in the selected temperature range. The stability is maintained for 120 hours at 700° C. (FIG. 4b).

Figure 5:
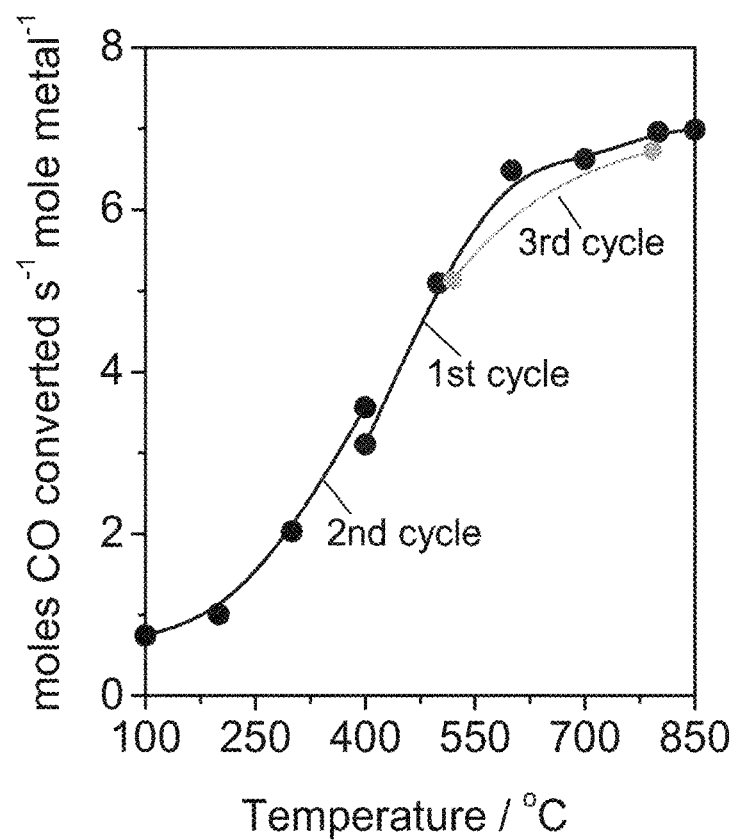
FIG. 5 shows a graph comparing catalytic activity in different temperature ranges after being exposed to extreme thermal treatment.

FIG. 5 verifies the stability of the catalyst after being exposed to an extreme thermal treatment. The material is still very active and 50 mg of the catalyst is capable to convert 8600 ppm of CO at 400° C. In addition, no signal of deactivation is observed on the catalytic performance after three cycles of reaction in a temperature range of 30-850° C.

Evaluation of Catalytic Activity ($H_2$ Oxidation):

Catalytic evaluation was performed under gas-flow conditions. For this purpose, a mixture containing a desired concentration of $H_2$ in wet air (2000 ppm and Relative Humidity=90%) was introduced into a tubular quartz fixed-bed reactor provided with the catalytic bed thereon. Thereafter, isothermal tests were conducted at ambient conditions (25° C., 1 bar) and the stability was evaluated for several days in the full gas mixture. The reactants and products were analysed by Gas Chromatography coupled to Mass Spectrometer (GC-MS) and equipped with a capillary PoraPLOT U column.

Figure 6:
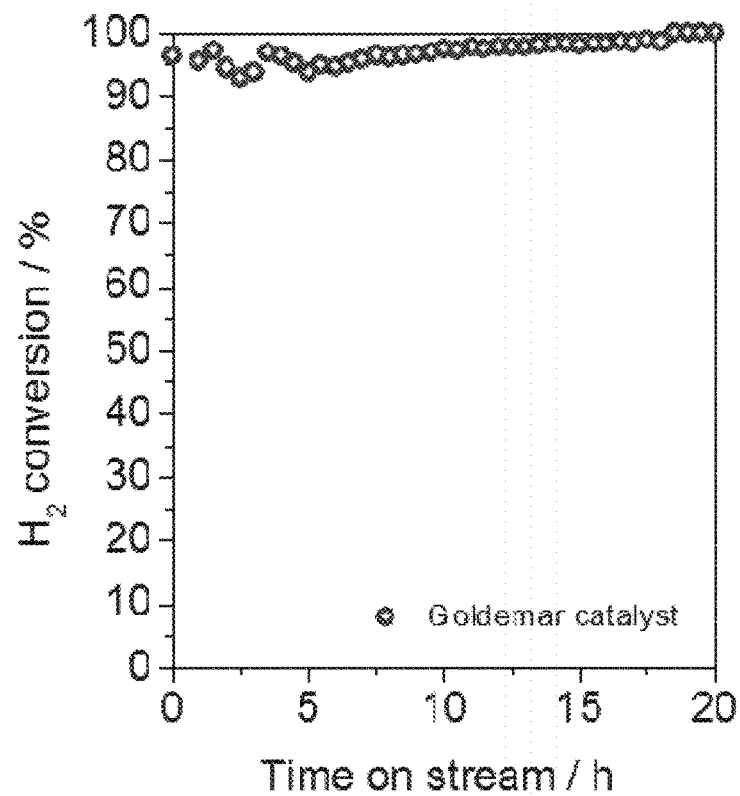
FIG. 6 shows a graph of H2 conversion with time at ambient conditions.

The results are shown in FIG. 6, and demonstrate high catalytic and short-term stability of the catalyst towards $H_2$ oxidation. As shown, the catalyst is capable of converting 2000 ppm of hydrogen into water at wet ambient conditions using a Gas Hourly Space Velocity of 85.000 h−1 without any signal of deactivation.

Low Temperature Oxidation of Diesel Soot Induced by Gold Catalysts:

In order to find out whether gold plays a key role to lower the ignition temperature of soot (typically above 450° C.), model soot (commercial carbon black, printex U) were decorated with different contents of gold (0.05 vol. %, 0.1, 0.3 0.5 and 1.5 wt. %, respectively). The latter approach allowed for further determination of reactivity-selectivity-particle size relationships (higher amounts of gold, larger particles).

The experimental study of the thermal decomposition of model soot containing gold was performed by placing 20 mg of each catalyst in a U-tube reactor, which was heated from 25 to 900° C. (5° C. min−1) in a 14% $O_2$ in Ar atmosphere. The results presented in Table 1 indicate that an increase in the gold content leads to a decrease in the combustion temperature of soot, revealing the beneficial effect of Au.

More reduction in the combustion temperature is achieved by increasing the gold content, providing the maximum improvement at 0.5 wt. %. Gold contents of higher than 0.5 wt. %, i.e. 1.5 wt. %, does not result in a major capability of shifting the soot oxidation to lower temperatures, since bigger particles of gold are formed, thereby making the catalyst less active. The aforementioned results indicate that gold is significantly beneficial in decreasing the oxidation temperature of soot. In addition, they indicate that the catalyst is selective towards $CO_2$, even at low gold contents, i.e. 0.1 wt. %.

TABLE 1

Thermal decomposition of model soot (carbon black, printex U) containing different gold loading.

| | Thermal decomposition | | | |
|---|---|---|---|---|
| Au loading/ wt. % | $T_{initial}$ (° C.) | $T_{maximum}$ (° C.) | $T_{final}$ (° C.) | $CO_2/CO$ ratio |
| 0 | 530 | 635 | 654 | 0.95 |
| 0.1 | 394 | 412 | 568 | 2.0 |
| 0.3 | 349 | 397 | 467 | 3.0 |
| 0.5 | 262 | 304 | 443 | 3.0 |
| 1.5 | 331 | 491 | 529 | 2.5 |

Evaluation of Volatile Organic Compound (VOC) Reduction Ability:

The list of the VOCs analysed is shown in Table 1. Several compounds were selected on the basis of their occurrence and adverse effects on environment and human health and comfort. Catalytic tests were carried out in a quartz fixed-bed reactor (5 mm i.d.) with 100 mg of sample (sieve fraction 200-300 mm), a total pressure of 1 bar and room temperature. Analysis of VOCs was performed by automatic thermal desorption (ATD) coupled with capillary gas chromatography (GC)/mass spectrometry detector (MSD), using a Perkin-Elmer ATD 400 (Perkin-Elmer, Boston, Mass., USA) and a ThermoQuest Trace 2000 GC (ThermoQuest, San Jose, Calif., USA) fitted with a ThermoQuest Trace Finnigan MSD. More detailed information about the protocol is described in Ribes et al, *Journal of Chromatography A*, 1140 (2007) 44.

A special protocol is used for determining the formaldehyde level present in the air and its conversion after passing through the catalyst. For this purpose, special pumps (AIRCHEK 2000 SKC) equipped with both flow mass and volume controllers are used; following the specifications fixed by the statute NTP-23 of the Instituto Nacional de Seguridad e Higiene en el Trabajo (INSHT) in Spain. The total mass flow in each experiment is 70 ml·min−1. The degree of formaldehyde converted is determined following the methodology described in MTA/MA—062/A08 of INSHT, which involves the adsorption of formaldehyde on silica impregnated with 2,4-dinitrofenylhydracine and its detection by UV/high resolution liquid phase chromatography. In this case, a HPLC equipped with Waters 1525 Binary Pump, Waters 717plus Autosampler, and Waters 996 Photo Diode Array Detector is utilized.

Table 2 shows the reduction ratio of several VOCs. Considering the list of pollutants tested, 0.1 wt. % $Au/CeO_2$ shows more reactivity for reducing organic compounds containing a terminal carbonyl group, i.e. aldehydes, than prior art catalysts. An exceptional reduction, 75%, is observed for formaldehyde.

TABLE 2

Reduction ratio of VOCs by 0.1 wt. % $Au/CeO_2$

| Sample | Reduction ratio |
|---|---|
| Methyl acetate | 0.94 |
| n-Hexane | 0.58 |
| Ethyl acetate | 0.69 |
| 1,1,2-Trichloroethane | 0.98 |
| Butyl acetate | 0.28 |
| Hexanal | 0.50 |
| Ethylbenzene | 0.97 |
| m + pXylene | 0.98 |
| Heptanal | 0.39 |
| a-Pinene | 0.96 |

TABLE 2-continued

Reduction ratio of VOCs by 0.1 wt. % Au/CeO$_2$

| Sample | Reduction ratio |
|---|---|
| Cyclohexanone | 0.28 |
| 2-butoxyethanol | 0.40 |
| Octanal | 0.43 |
| Nonanal | 0.40 |
| Decanal | 0.67 |
| Formaldehyde | 0.75 |

Evaluation of Stability of Gold Nanoparticle Solution:

The stability of the gold nanoparticle solution used in the above method was evaluated as follows. Fluorescence spectroscopy was used to monitor the solution over time (JASCO 2800 spectrofluorometer, room temperature, emission spectra recoded between 285-750 nm in 0.5 nm intervals at an excitation wavelength of 270 nm). A fluorescence emission band was observed at around 540 nm before the sonication step and no significant change in the band position was observed over time, even after a period of 150 minutes of sonication. This indicates that gold nanoparticles with identical particle size were immediately formed by contact of HAuCl$_4$ and polymethylacrylic acid, and said nanoparticles were also stable over time. This confirms that the charged carboxylates act as capping agent to prevent aggregation of gold nanoparticles and prevent further growth of the nanoparticles. After a sonication time of 30 minutes, a major number of gold nanoparticles were formed and no significant changes in the intensities of fluorescence were observed, even after being stored for 30 days.

Evaluation of Size of Gold Nanoparticles:

The size of the gold nanoparticles formed in the gold nanoparticle solution used in the above method was evaluated as follows. Nanoparticle films were prepared by drop casting the solution onto a mica and then drying with air at room temperature. The solutions were filtered through 0.25 micron PTFE filters.

Figure 7:
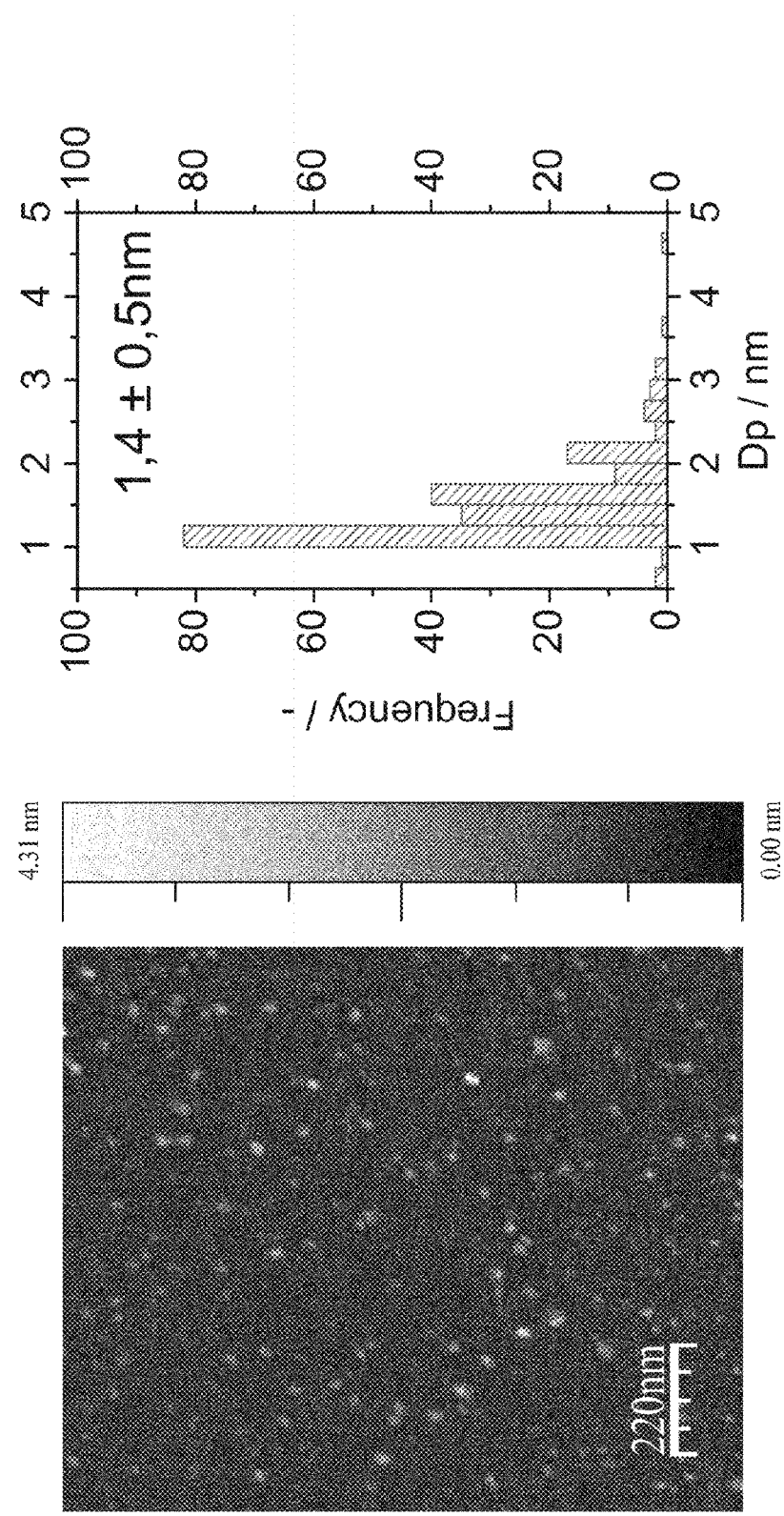
FIG. 7 shows an atomic force microscopy (AFM) image of the nanoparticle film of Example 2 (a) and a graph of the distribution of the particle sizes (b).

Atomic force microscopy measurements were recorded at room temperature using a VEECO Dimension 3100 Atomic Force Microscope in the tapping mode (silicon cantilevers 215-235 microns in length, resonance frequency ~84 kHz, tip height 15-20 microns), and the results are shown in FIG. 7. As shown, the gold nanoparticles formed have a particle size distribution of 1.4 nm±0.5 nm.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method for the manufacture of a catalyst comprising substrate particles having gold nanoparticles thereon, the method comprising:
    providing a first solution comprising gold nanoparticles comprising a capping agent;
    providing a second solution comprising substrate particles having polyelectrolyte on the surface thereof;
    combining the solutions to form substrate particles having gold nanoparticles thereon.

2. The method of claim 1 further comprising agitating the combined solutions.

3. The method of claim 2 wherein the agitation comprises sonication.

4. The method of claim 1 wherein the capping agent comprises a gold-reducing polyelectrolyte.

5. The method of claim 1 wherein the substrate particles comprise one or more of carbon nanotubes, active carbon, graphene and inorganic oxides selected from the group consisting of one or more of CeO$_2$, TiO$_2$, Fe$_2$O$_3$ and SiO$_2$.

6. The method of claim 1 wherein the polyelectrolyte on the surface of the substrate particles comprises polyallylamine.

7. The method of claim 1 further comprising recovering the substrate particles having gold nanoparticles thereon.

8. The method of claim 1 further comprising calcination of the substrate particles having gold nanoparticles thereon.

9. The method of claim 1 wherein the capping agent comprises polymethylacrylic acid (PMAA).

10. The method of claim 1 wherein the polyelectrolyte on the substrate surface comprises polymethylacrylic acid (PMAA).

11. The method of claim 1 wherein:
    the gold nanoparticles comprise a capping agent comprising PMAA;
    the substrate particles comprise one or more of carbon nanotubes, active carbon, graphene and inorganic oxides selected from the group consisting of one or more of CeO$_2$, TiO$_2$, Fe$_2$O$_3$ and SiO$_2$;
    at least some of the gold nanoparticles have a longest dimension of not more than 8 nm;
    the polyelectrolyte on the surface of the substrate particles comprises polyallylamine;
    the method further comprises recovering the substrate particles having gold nanoparticles thereon by a method selected from the group consisting of filtration, lyophilising, drying, and freeze drying.

12. The method of claim 1 wherein the substrate particles comprise carbon nanotubes.

13. A catalyst produced by the method of claim 1.

14. A catalyst comprising
    substrate particles having a polyelectrolyte on the surface thereof; and
    gold nanoparticles on the substrate particles wherein the gold nanoparticles comprise a capping agent.

15. The catalyst of claim 14 wherein the capping agent comprises polymethylacrylic acid (PMAA).

16. The catalyst of claim 14 wherein at least some of the gold nanoparticles have a longest dimension of not more than 8 nm.

17. The catalyst of claim 14 wherein the substrate particles comprise one or more of carbon nanotubes, active carbon and inorganic oxides selected from the group consisting of one or more of CeO$_2$, TiO$_2$, Fe$_2$O$_3$ and SiO$_2$.

18. The catalyst of claim 14 comprising less than 5 wt % gold.

19. The catalyst of claim 14 wherein the gold nanoparticles are supported on the substrate particles via the polyelectrolyte on the substrate particles.

20. The catalyst of claim 14 incorporated into a cigarette filter, an air conditioning unit, an exhaust, or a diesel exhaust.

* * * * *